United States Patent
Huitric et al.

(10) Patent No.: US 11,514,913 B2
(45) Date of Patent: Nov. 29, 2022

(54) COLLABORATIVE CONTENT MANAGEMENT

(71) Applicant: LogMeIn, Inc., Boston, MA (US)

(72) Inventors: Alexander John Huitric, Goleta, CA (US); Christfried H. Focke, Titisee-Neustadt (DE); Nilesh Mishra, Goleta, CA (US)

(73) Assignee: GOTO GROUP, INC., Boston, MA (US)

( * ) Notice: Subject to any disclaimer, the term of this patent is extended or adjusted under 35 U.S.C. 154(b) by 276 days.

(21) Appl. No.: 16/685,057

(22) Filed: Nov. 15, 2019

(65) Prior Publication Data

US 2021/0151055 A1    May 20, 2021

(51) Int. Cl.
| | |
|---|---|
| *G10L 15/26* | (2006.01) |
| *G10L 15/02* | (2006.01) |
| *G06F 16/9032* | (2019.01) |
| *G06F 40/242* | (2020.01) |
| *G06V 30/148* | (2022.01) |

(52) U.S. Cl.
CPC ........ *G10L 15/26* (2013.01); *G06F 16/90332* (2019.01); *G06F 40/242* (2020.01); *G06V 30/153* (2022.01); *G10L 15/02* (2013.01); *G10L 2015/025* (2013.01)

(58) Field of Classification Search
CPC .............. G10L 15/26; G10L 2015/025; G06F 16/90332; G06F 40/242; G06K 9/344; G06V 30/153
See application file for complete search history.

(56) References Cited

U.S. PATENT DOCUMENTS

| | | | |
|---|---|---|---|
| 8,688,738 B2 | 4/2014 | Colton et al. | |
| 9,832,237 B2 | 11/2017 | Lock et al. | |
| 10,093,579 B2 | 10/2018 | Jonkers et al. | |
| 10,248,934 B1 * | 4/2019 | Shen | G10L 15/26 |
| 2003/0187632 A1 * | 10/2003 | Menich | H04L 65/4038 704/1 |
| 2008/0243637 A1 * | 10/2008 | Chan | G06Q 30/02 705/26.1 |
| 2012/0143605 A1 * | 6/2012 | Thorsen | G10L 15/183 704/235 |
| 2013/0339431 A1 * | 12/2013 | Yannakopoulos | H04L 12/1827 709/204 |
| 2017/0365251 A1 * | 12/2017 | Park | G10L 15/14 |
| 2018/0212790 A1 * | 7/2018 | Jacobson | H04L 12/1831 |
| 2018/0232705 A1 * | 8/2018 | Baker | G06F 3/0482 |
| 2018/0302761 A1 * | 10/2018 | Rizzolo | H04L 12/1822 |
| 2020/0242151 A1 * | 7/2020 | Adlersberg | G06F 16/483 |

* cited by examiner

*Primary Examiner* — Sonia L Gay
(74) *Attorney, Agent, or Firm* — BainwoodHuang (57) ABSTRACT

A technique manages collaborative web sessions (CWS). The technique receives graphical content of a CWS. The technique translates a set of portions of the graphical content into text output. The technique provides the text output to a set of text application services. The set of text application services associate the text output with the CWS.

22 Claims, 7 Drawing Sheets

COLLABORATIVE CONTENT MANAGEMENT

BACKGROUND

Web-hosted services are becoming increasingly popular. Examples of web-hosted services include online meetings and desktop sharing. Online meetings enable computer users to meet online with other users, such as customers, clients, or colleagues, via the Internet and to exchange video and audio in real time, such that participants can communicate virtually, face-to-face. Desktop sharing transmits a desktop of a web-hosted computer to a client computer over the Internet and allows a user of the client computer to interact with the remote desktop as if it were local. Some web hosted services include platforms that enable creation, archiving, and storage of video conferences. Users may browse previous conferences and play them back.

SUMMARY

Existing web-hosted services have many useful features. Modern web conferencing platforms are capable of recording audio and video from web conferences. Some can generate transcripts of spoken content and can even allow searching of terms that appear in transcripts. Unfortunately, current transcripts of web conferences are limited to content that is spoken and exclude content that is shown. Thus, for example, content displayed on a whiteboard in plain view a conference participant's webcam is excluded from any transcript or other searchable medium. A person interested in the conference may have no other choice but to manually scrub a video to locate a portion of the video that the person is interested in viewing. A great deal of useful information contained in a conference thus remains hidden, potentially undermining much of the utility of conference archiving.

In contrast with prior approaches, in which transcripts include content that is spoken but not shown, an improved technique captures graphical content visible onscreen during a collaborative web session (CWS) and renders that content as text output. The text output is applied to a set of text application services that associate the text output with the CWS. Advantageously, text output from content displayed during the CWS becomes part of a record of the session, making it available for searching, recommending other content, and/or enhancing speech-to-text processing, for example.

Certain embodiments are directed to a method of managing collaborative web sessions. The method includes receiving graphical content of a CWS. The method includes translating a set of portions of the graphical content into text output. The method further includes providing the text output to a set of text application services. The set of text application services may associate the text output with the CWS.

Other embodiments are directed to a computerized system constructed and arranged to perform a method of managing collaborative web sessions, such as the method described above. Still other embodiments are directed to a computer program product. The computer program product stores instructions which, when executed on control circuitry of a computerized system, cause the computerized system to perform a method of managing collaborative web sessions, such as the method described above.

In some examples, in providing the text output to the set of text application services, at least one of the text application services associates the text output with another CWS.

Some examples include detecting the graphical content from the CWS based on image analysis of frames of the CWS. In some examples, the graphical content is derived from multiple sources. In some examples, the sources include a screen share source and a webcam source. In some examples, translating the set of portions of the graphical content into text output includes performing optical character recognition (OCR) on the set of portions.

Some examples include accepting user input via a graphical user interface (GUI). The user input may specify a set of modifications of the text output produced by performing the OCR on the set of portions. In some examples, the text output includes multiple words and/or phrases that are specific to a particular domain of expertise. Some examples include receiving user input that specifies a pronunciation and/or phonetic representation of a word or phrase of the text output.

In some examples, the set of text application services includes a recommendation engine that generates elements on a displayed page of the GUI that provide recommendations of collaborative web sessions to view based on the text output.

In some examples, the set of text application services further includes a search engine. In some examples, providing the text output to the set of text application services may include updating a search index of the search engine to include a word or phrase identified in the text output. In some examples, including the word or phrase further involves including words or phrases that are semantically similar to the word or phrase identified in the text output.

Some examples may include, in response to receiving a search query specifying a search word or phrase in the text output, displaying by the GUI a set of elements referencing respective collaborative web sessions where the search word or phrase has been found. In some examples, one or more locations and/or times of a frame of the collaborative web sessions may be referenced.

Some examples may include, while the CWS is in progress, providing portions of the text output to the search index, accepting a search query from a user, the search query specifying a word or phrase to be searched, and identifying a previously-displayed frame of the CWS at which the word or phrase to be searched is detected.

In some examples, the set of text application services includes a speech-to-text (STT) engine having a STT dictionary. The STT dictionary may include terms that are available to be matched to spoken utterances. Some examples may also include providing multiple words and/or phrases of the text output to the STT dictionary and directing the STT engine to convert spoken utterances in the CWS to corresponding text based upon matching the spoken utterances to the terms in the STT dictionary. The matched terms may include one or more of the words and/or phrases of the text output.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique captures graphical content visible onscreen during a collaborative web session (CWS) and renders that graphical content as text output. The text output is then applied to a set of text application services that associate the text output with the CWS.

According to some examples, a "collaborative web session" or "CWS" as referred to herein may include but is not limited to one or more of a web conference, web presentation, and/or conference recording. One or more entities may access the CWS. Entities may include users, and the term "users" is intended to include living persons, as well as businesses, computing machines, servers, and/or clients.

In some examples, the text application services may include but are not limited to a speech-to-text service (STT service), a recommendation service, and/or a search service. In some examples, providing the text output to the STT service improves the quality of an STT translation of audio from the CWS, e.g., by expanding a vocabulary words and/or phrases available to the STT in translating speech to text. In some examples, the text output tailors the STT service to a particular domain or context of interest/expertise. In some examples, the recommendation service provides helpful, content-based recommendations based on words and/or phrases found in the text output. In some examples, the search service enables a user to efficiently search for and navigate to graphical content of interest, based on the words and/or phrases in the text output.

Advantageously, embodiments of the improved technique permit the text application services to benefit not only from what is spoken during a CWS, but also from what is shown. Such services can thus perform more effectively, as they operate with a larger set of information than what transcribed speech alone could provide.

Figure 1:
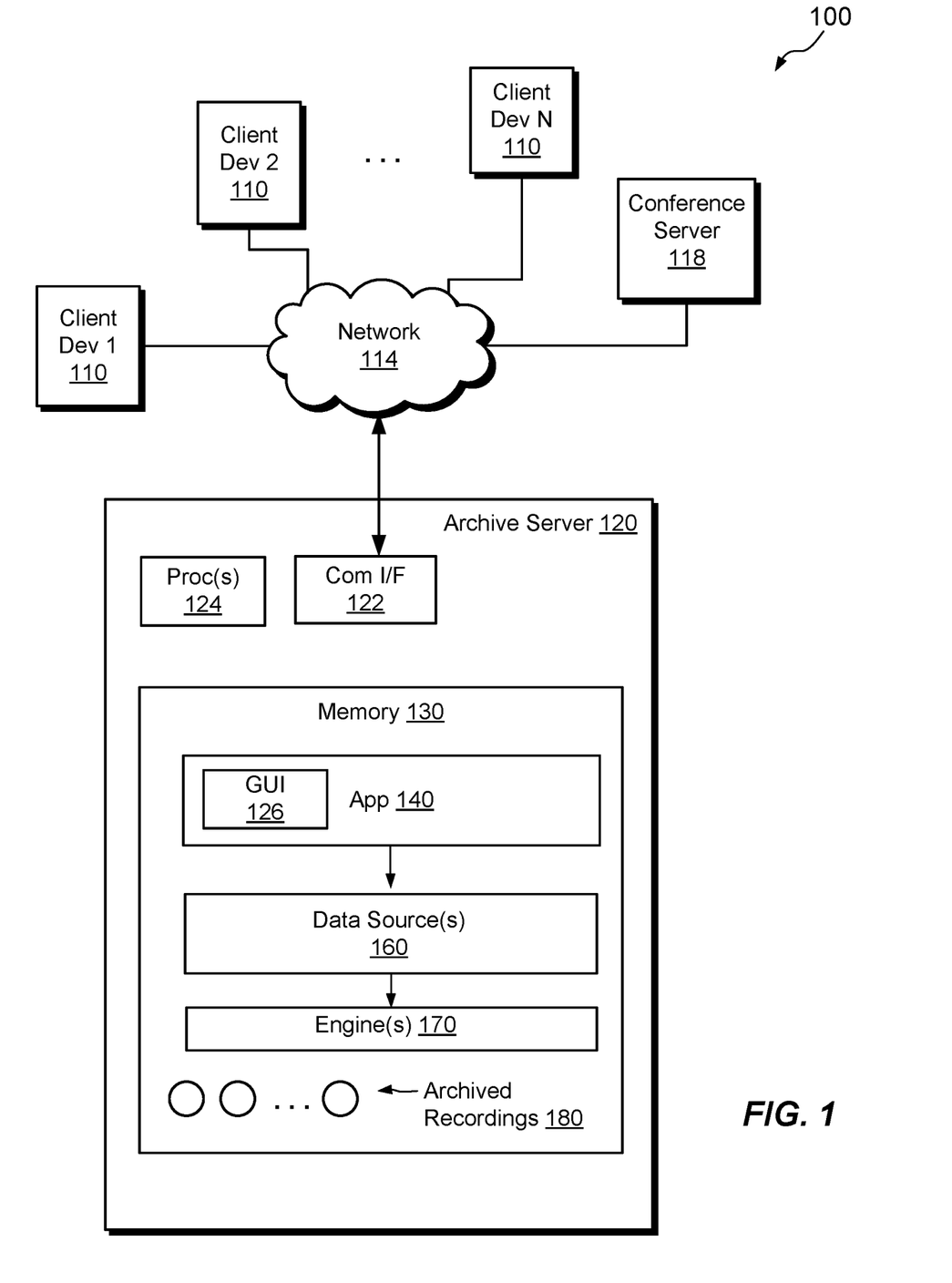
FIG. 1 is a block diagram of an example environment in which embodiments of the improved technique can be practiced.

FIG. 1 shows an example environment 100 in which embodiments of the improved technique can be practiced. The environment 100 includes a conference server 118, client devices 110, and an archive server 120, which are connected to a network 114.

The archive server 120 may include one or more processors 124, a communications interface 122, and a memory 130. As further shown in FIG. 1, the memory 130 "includes," i.e., realizes by execution of software instructions, an application 140, data sources 160, engines 170, and recordings 180 of collaborative web sessions, which may include both previously recorded conferences and conferences currently in progress.

Although the archive server 120 is shown separately from the client devices 110 and conference server 118, the archive server 120 may be located on or within any device connected to or within the network 114, such as any of the client devices 110 or the conference server 118. The archive server 120 may be distributed physically or logically across multiple devices that are connected to or within the network 114, such as two or more of the client devices 110, or between one or more of the client devices 110 and the conference server 118. The network 114 may be any type of network or combination of networks, such as a local area network (LAN), a wide area network (WAN), a telephone network (PSTN), an intranet, the Internet, and/or some other type of network or combination of networks, for example.

In some examples, within the archive server 120, the communication interfaces 122 include one or more network interface adapters, such as Network Interface Cards (NICs), Wi-Fi antennas, or the like. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

Figure 2A:
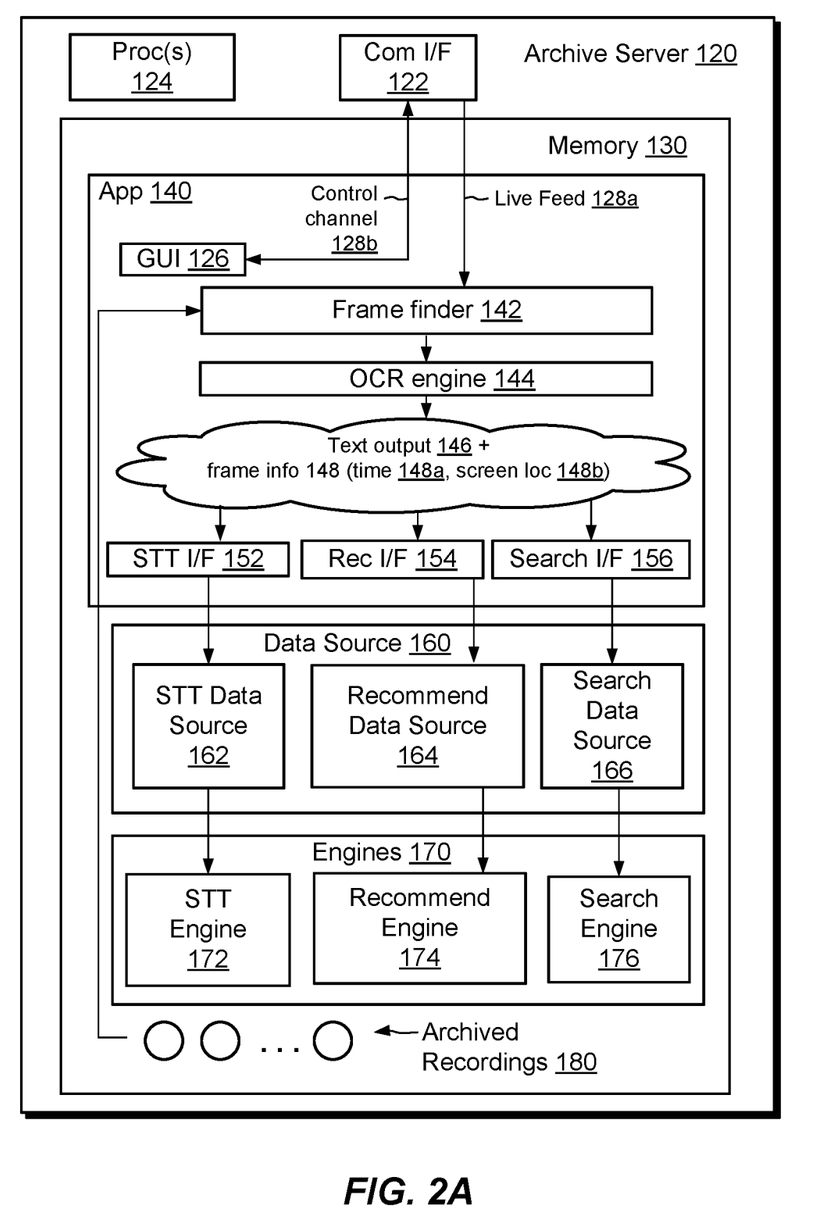
FIG. 2A is a block diagram of the example archive server of FIG. 1.

FIG. 2A shows an example archive server 120 of FIG. 1 in greater detail. As shown in memory 130, the application 140 may include a graphical user interface (GUI) 126, a frame finder 142, an optical character recognition (OCR) engine 144, and text output 146, which may include conference frame information 148, such as frame time 148a and/or screen location 148b within the frame of images translated by the OCR engine 144. The application 140 may further include interfaces, such as a speech to text (STT) interface 152, a recommendation interface 154, and a search interface 156.

As further shown in memory 130, the data sources 160 may include an STT data source 162, a recommendation data source 164, and search data source 166. The engines 170 may include an STT engine 172, a recommendation engine 174, and a search engine 176.

In some examples, the GUI 126 may receive user input via the communication interface 122. In some examples, the GUI 126 may receive the user input via control channel 128*b*.

In some examples, the frame finder 142 may receive graphical content, such as live video and/or screen capture images as live feed 128*a*. The frame finder 142 may receive similar graphical content from archived recordings 180.

In some examples, the graphical content may be derived from or received from a variety of information sources of the CWS. Some of these sources include recordings of web conference presentations. Types of information sources include but are not limited to stream, screen share, webcam, visual, video frames in real-time, image, chat, whiteboard background, whiteboard filter, one or more objects within one or more frames, and/or one or more icons within one or more frames. In some examples, the graphical content is accompanied by telemetry information such as a log of events, states, and/or transitions within the CWS. In some examples, the method aggregates the received graphical content and telemetry information from the information sources.

In some examples, the graphical content may be detected by performing image analysis of one or more frames of the live feed 128*a* and/or archived recordings 180. The frame finder 142 may perform the detection. Such detection may include detecting image-based text in one or more video frames in real-time or near real-time, detection of images, detection of objects within one or more frames, and/or detection of icons within one or more frames.

In some examples, the frame finder 142 aggregates, assembles, and/or selects information from the information sources and forwards the selected information to the OCR engine 144. The OCR engine 144 performs optical character recognition (OCR) on the selected information and generates text output 146, which may be rendered in any suitable text format (e.g., ASCII, Unicode, etc.). The information processed by the OCR engine 144 may include images of computer-generated, typed, handwritten, and/or printed text, and/or any type of graphical content that can be interpreted as characters.

In some examples, the text output 146 is accompanied by frame information that may include one or more frame times 148*a* within a CWS and one or more screen locations 148*b* within frames of a CWS. The application 140 forwards the text output 146 via interfaces 152, 154, 156 to data sources 162, 164, 166, respectively. The data sources 162, 164, 166 may modify or leave unchanged the text output 146, and make the text output 146 available to the engines 172, 174, 176, respectively, for performing their respective operations.

In some examples, the frame finder 142 may receive the graphical content from multiple collaborative web sessions, including a current web session, as well as any number of other collaborative web sessions. Graphical content received from multiple collaborative web sessions may be distinguished based on session identifiers or other indicators, such as starting times, ending times, indications within text or images, or other indications known to one skilled in the art.

The multiple collaborative web sessions may be live sessions, archived recordings, or a combination of one or more live sessions and archived recordings. The multiple collaborative web sessions may occur at the same time, be partially overlapping in time, or occur at different times (without any time overlap between them).

Figure 2B:
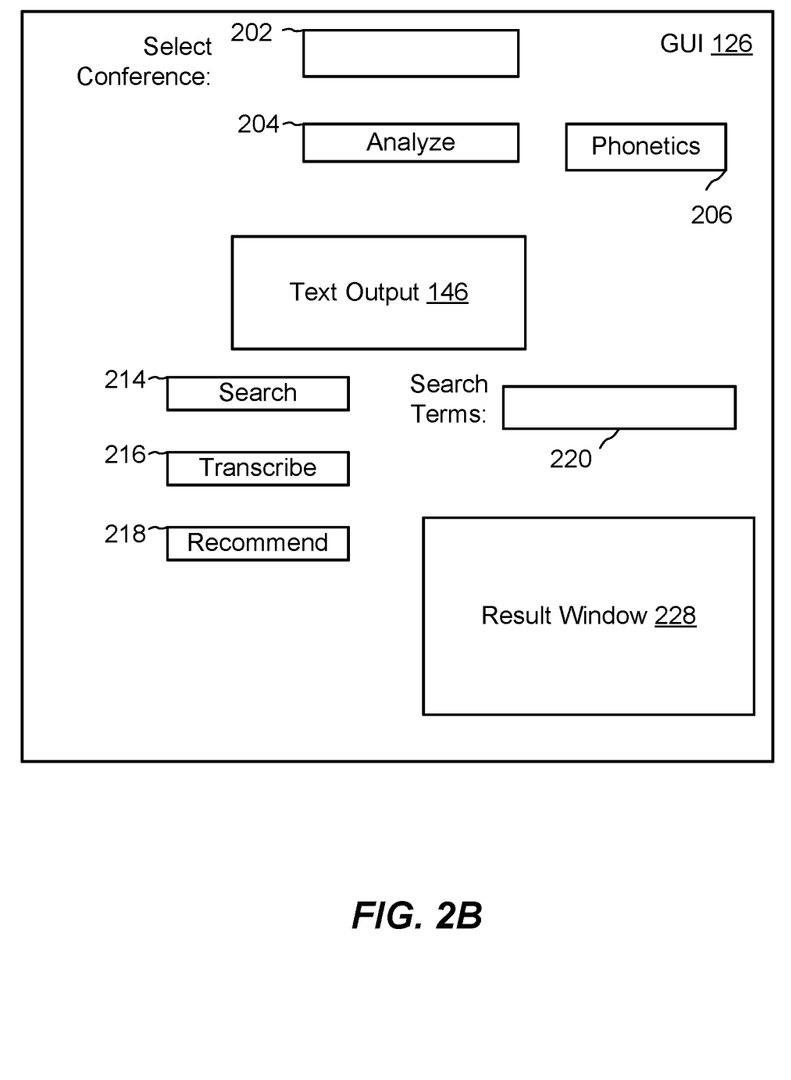
FIG. 2B is a graphical user interface for managing collaborative web sessions.

FIG. 2B shows an example graphical user interface (GUI) 126 for managing collaborative web sessions. The GUI may provide access to one or more collaborative web sessions and may assist in applying the text output 146 as described to follow.

The GUI 126 provides with various options for receiving user input. A user may provide user input by entering or selecting one or more collaborative web sessions via an entry field 202, entering phonetics via a phonetics field 206, and/or entering search terms via a search field 220. The user may edit the phonetics field 206 to specify a pronunciation and/or phonetic representation of a word or phrase of the text output 146. In an example, a pronunciation and/or phonetic representation may include a collection of phonemes or other sound representations.

According to some examples, the GUI 126 includes a button 204, which the user can click to Analyze the text output 146, e.g., by invoking the frame finder 142 and OCR engine 144. The user may modify the text output 146 by editing one or more portions of the text output 146 after the OCR is complete. In some examples, the user may select portions of the text output 146 to correct errors made by the OCR engine 144 in generating the text output 146. In addition, the user may provide input by activating buttons to Search 214, Transcribe 216, and/or Recommend 218. In some examples, the conference selection field 202 allows the user to enter or select one or more collaborative web sessions, which may include the live feed 128*a* and/or any archived recordings 180.

According to some examples, the user may perform an STT by activating the transcribe button 216, which triggers the STT engine 172 to perform an STT on audio of a selected CWS. Rather than responding to a button, the STT engine 172 in some examples may be triggered to perform the STT automatically and/or through some other entity. The STT uses the text output 146 as part of a dictionary, so that words and phrases from the text output 146 are made available for selection by the STT engine. In some examples, the STT includes biasing based upon the text output 146. In some examples, the STT may be biased such that it preferentially selects words or terms that occur in the text output 146. In some examples, the STT may be biased in favor of phonetics 206 entered by the user. The resulting text produced by the STT may be displayed in the result window 228.

In some examples, the user or other entity initiates a search query by entering one or more search term(s) in the search term field 220 and activating the search button 214. In some examples, the text output 146 may correspond to and/or may be included at one or more points or locations in the collaborative web sessions being searched, such as frames of the collaborative web sessions. Therefore, in some examples, the search engine 176 searches for the search term(s) in the search data source 166, which has been updated to include the text output 146, and directs the user to a point or location in the collaborative web session(s) where the search term(s) can be found. The search may be performed across current and/or previous collaborative web sessions.

In some examples, in response to receiving a search query specifying a search word or phrase to be searched in the text output 146, the GUI 126 may display in the result window 228 a set of elements referencing respective locations in one or more collaborative web sessions where the search word or phrase entered in the search terms field 220 has been found. The search engine 176 may perform the search based on an elastic search or in-web page search, as known to one skilled in the art. The search may be a real-time or distributed search.

In some examples, the GUI 126 may be shared with multiple users. The multiple users may operate features of the GUI 126, as also recited herein with respect to one user. The multiple users may coordinate. Coordination may be provided based on a display of indications of the GUI 126 in the result window 228 as to which one or more users are using the GUI 126, although such a display is not required. In addition, multiple instances of the GUI 126 may be provided for respective users or groups of users.

According to some examples, the user may receive recommendations by activating the recommend button 218, which triggers the recommendation engine 174 to provide one or more recommendations to the user. The recommendation engine 174 may determine the one or more recommendations based at least in part on the text output 146. Given that the recommend engine 174 may include profiles and histories for particular users, the one or more recommendations may also be based on the user's viewing history of prior collaborative web sessions. The one or more recommendations may be displayed to the user in the result window 228.

According to some examples, referring back to FIGS. 1-2A, the computerized system 100 is constructed and arranged to manage collaborative web sessions. As illustrated in FIG. 2A, in some examples, the frame finder 142 may receive graphical content of one or more collaborative web sessions as live feed 128*a* and/or as archived recordings 180.

In some examples, the frame finder 142 may identify or detect the graphical content from the live feed 128*a* or archived recordings 180. The frame finder may identify or detect the graphical content from the live feed 128*a* or archived recordings 180 by examining an area of the graphical content such as an image or portion thereof, also known as content area detection to one skilled in the art. The frame finder 142 may gather, aggregate, and/or assemble the graphical content prior to forwarding to the graphical content to the OCR engine 144.

In some examples, the OCR engine 144 performs a translation, such as optical character recognition, on the received graphical content provided by the frame finder 142 to provide text output 146. As illustrated in FIG. 2A, the OCR engine 144 provides the text output 146 to a set of data sources 160 that forward the text output 146 (in a modified or unmodified form) to a set of engines 170. The engines 170 perform text application services that may include but are not limited to a speech to text (STT) service by a STT engine 172, a recommendation service by a recommendation engine 174, and search service by a search engine 176. In some examples, the text application services may be performed on one or more collaborative web sessions.

As shown in FIG. 2A, according to some examples, the OCR engine 144 provides the text output 146 to interfaces 152, 154, 156, which provide the text output 146 to respective data sources 162, 164, 166. The data sources 162, 164, and 166 make the text output 146 available to the respective engines 172, 174, 176.

In some examples, the system 100 of FIG. 1 manages graphical content. For example, the archive server 120 receives graphical content of the CWS from the live feed 128*a* and/or the archived recordings 180. The archive server 120 performs an OCR translation by the OCR engine 144 of one or more portions of the graphical content, translating the one or more portions of the graphical content into text output 146. The archive server 120 provides the text output to one or more text application services, including the STT engine 172, the recommendation engine 174, and/or the search engine 176. The text application services 172, 174, 176 then associate the text output with the CWS, as described in more detail to follow with respect to each of the STT engine 172, the recommendation engine 174, and the search engine 176.

According to some examples, the STT engine 172 receives audio of the CWS via life feed 128*a* or via archived recordings 180 of current or past collaborative web sessions. The STT engine 172 converts the audio to text.

According to some examples, the STT data source 162 may have a STT dictionary. In some examples, in converting the audio to text, the text output 146 may be provided as input into the STT dictionary, such that the entered text output 146 can be available for matching to sounds in the audio during operation of the STT engine 172. The STT dictionary may receive text output 146 from a single CWS or from multiple collaborative web sessions. For example, text output 146 may be combined from multiple collaborative web sessions made by the same users and/or addressed to similar subject matter.

The STT dictionary may include terms that are available to be matched to spoken utterances of audio received from the CWS and/or from other collaborative web sessions. The STT engine 172 may convert the spoken utterances to corresponding text based upon matching the spoken utterances to the terms in the STT dictionary. The spoken utterances may be included in audio received by the STT engine 172 from the live feed 128*a* and/or from archived recordings 180. The matched terms may include one or more of the words and/or phrases of the text output 146. Words and/or phrases in the text output 146 may occur at certain frequencies, and the STT may preferentially select words or phrases with higher frequencies. In other words, the STT engine 172 may bias the dictionary to perform the STT in favor of words and/or phrases that occur more frequently.

In some examples, the recommendation engine 174 may record a history of users and videos (e.g., collaborative web sessions) that the users have viewed. The recommendation engine 174 may derive a weighted score of videos of interest to a user based on occurrence or frequency of keywords found in the videos. The recommendation engine 174 may make a recommendation to the user of a video to watch based on the derived weighted score. In some examples, the recommendation may be based at least in part on a history of recorded collaborative web sessions of the archived recordings 180 as viewed by the user or a likeness of the user. The recommendation engine 174 may record information from multiple collaborative web sessions, and the recommendation may be based on collective information across the multiple collaborative web sessions.

According to some examples, the recommendation may be based on a context or domain-specific area of interest to the user or a likeness of the user. The recommendation engine 174 may generate elements on a displayed page, or results window 228, of the GUI 126, that provide recommendations of collaborative web sessions to view based at least in part on the text output 146. Based on the text output 146, the recommendation may be tailored to a particular domain or context of interest to the user and may be a recommendation of one or more videos, recordings, collaborative web sessions, images, and/or text output that the user, or a likeness of the user, has accessed in current or past collaborative web sessions.

In some examples, the search engine 176 receives the text output 146. The text output 146 may include searchable text, such as searchable text strings. The search engine 176 may search for one or more search terms in transcripts and text output 146 of one or more collaborative web sessions and may direct the user to a point or location in one or more collaborative web sessions where the one or more search terms can be found. In some examples, the user may provide the search index via the search term entry field 220 of the GUI 126. In some examples, the search index may be provided by a non-user entity, such as a web crawler or other background process.

In some examples, the search engine 176 may enable multiple users to share a search index or share multiple search indices. Search indices may be displayed within the result window 228 or some other window to inform users search indices being used. In some examples, users may operate the GUI 126 to select search indices they wish to use in implementing their searches.

In some examples, the GUI 126 may respond to a search query by jumping or moving to a portion of a recording of a CWS that corresponds to the words or phrases that are entered as search terms 220 in the GUI, or to words or phrases that are semantically similar to the entered terms. For instance, the GUI may respond to an entry of "coffee" by expanding the search to also include "cappuccino," "espresso," and/or "beverage," and then jumping or moving to a portion of the recording that displays any of those words. In some examples, the search engine 176 performs the search while a CWS is in progress. The search engine 176 may identify a previously-displayed frame of the CWS at a location in the CWS at which the word or phrase to be searched is detected.

The search engine 176 may search graphical content from multiple collaborative web sessions including a current CWS and another CWS. The search may be based on collective graphical content across or between multiple collaborative web sessions. In some examples, the search engine 176 may identify a previously-displayed frame by searching across or between multiple collaborative web sessions for the frame. The search engine 176 may detect one occurrence of the frame. In some examples, the search engine 176 may detect duplicate occurrences of the frame within a given CWS or within multiple collaborative web sessions. If duplicate occurrences of a frame are detected, the search engine 176 may report the occurrences and corresponding indications to the user through the result window 228 of the GUI 126.

FIGS. 3-6 show example methods 300, 400, 500, and 600 that may be carried out in connection with the system 100. The methods 300, 400, 500, and 600 are typically performed, for example, by the software constructs described in connection with FIGS. 1-2A, which reside in the memory 130 of the archive server 120 and are run by the set of processing units 124. The various acts of methods 300, 400, 500, and 600 may be ordered in any suitable way. Accordingly, embodiments may be constructed in which acts are performed in orders different from those illustrated, which may include performing some acts simultaneously.

Figure 3:
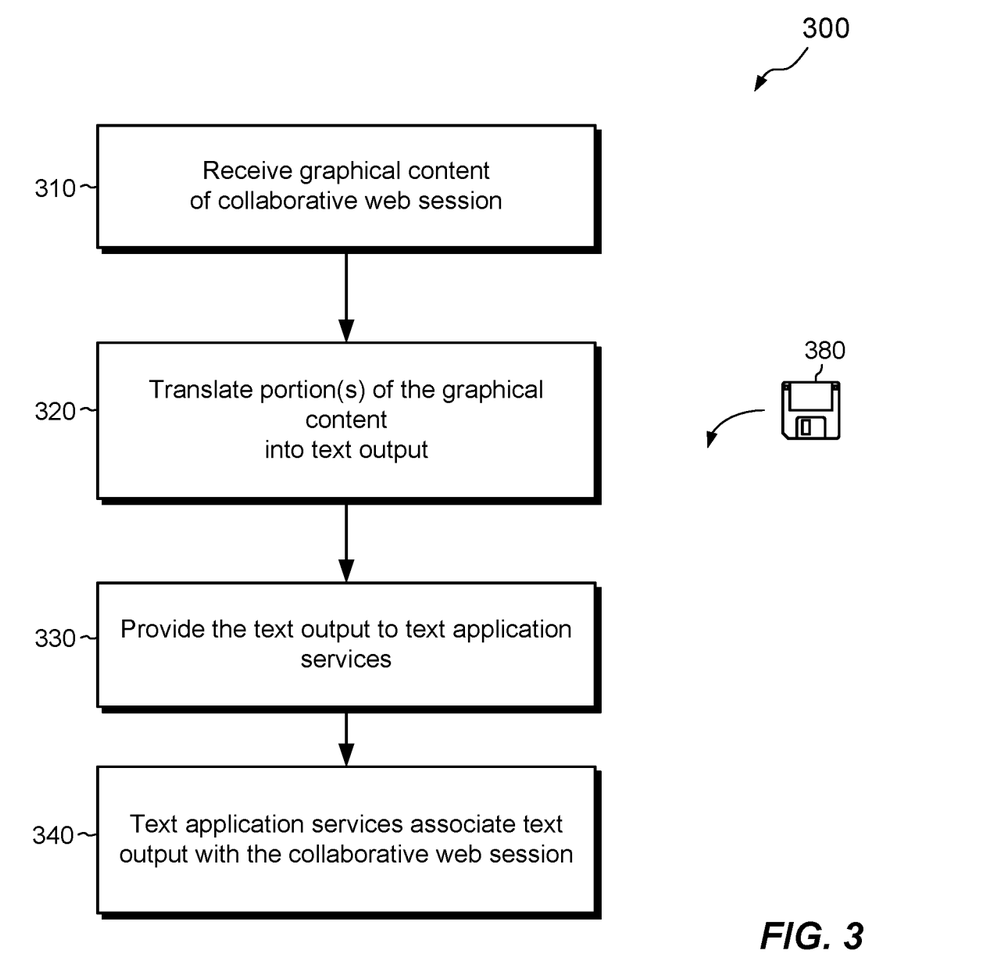
FIG. 3 is a flowchart showing an example method of managing collaborative web sessions.

FIG. 3 is a flowchart showing an example method 300 of managing collaborative web sessions. At 310, the method 300 receives graphical content, of the CWS from the live feed 128a and/or the archived recordings 180. At 320, the method 300 performs an OCR, by the OCR engine 144, on one or more portions of the graphical content, translating one or more portions of the graphical content into text output 146. At 330, the method 300 provides the text output 146 of the OCR engine 144 to one or more text application services, such as the STT engine 172, recommendation engine 174, and/or search engine 176. At 340, the text application service engines 172, 174, 176 associate the text output 146 with the CWS, as previously described above with respect to the environment 100. The method 300 may save the results of the application services on media 380. In some examples, the method 300 saves the results of the application services in the memory 130, in the archived recordings 180, and/or on any device connected to the archive server 120 across the network 114.

Figure 4:
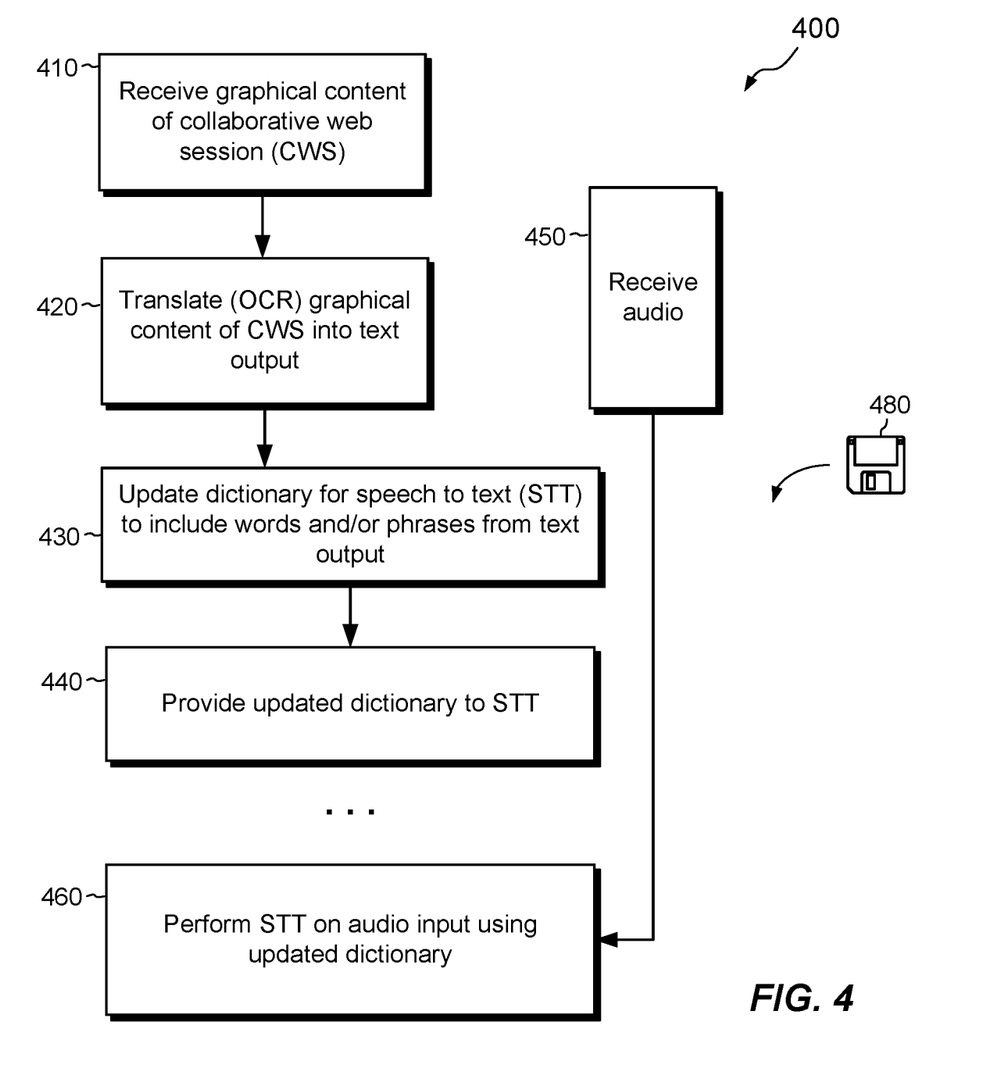
FIG. 4 is a flowchart showing an example method of managing collaborative web sessions in which a speech to text (STT) translation is performed.

FIG. 4 is a flowchart showing an example method 400 of managing collaborative web sessions in which a speech to text (STT) translation is performed. At 410, the method 400 receives graphical content of the CWS. At 420, the method 400 translates, or OCRs, the graphical content of the CWS into text output. At 430, the method 400 updates the dictionary for STT to include words and/or phrases from the text output. At 440, the method 400 provides the updated dictionary to the STT. Sometime later at 450, audio is received from the CWS and, at 460, the method 400 performs the STT on the received audio, based on the updated dictionary. The method 400 may save the results of the STT on media 480. In some examples, the method 400 saves the results of the STT in the memory 130, in the archived recordings 180, and/or on any device connected to the archive server 120 across the network 114.

Figure 5:
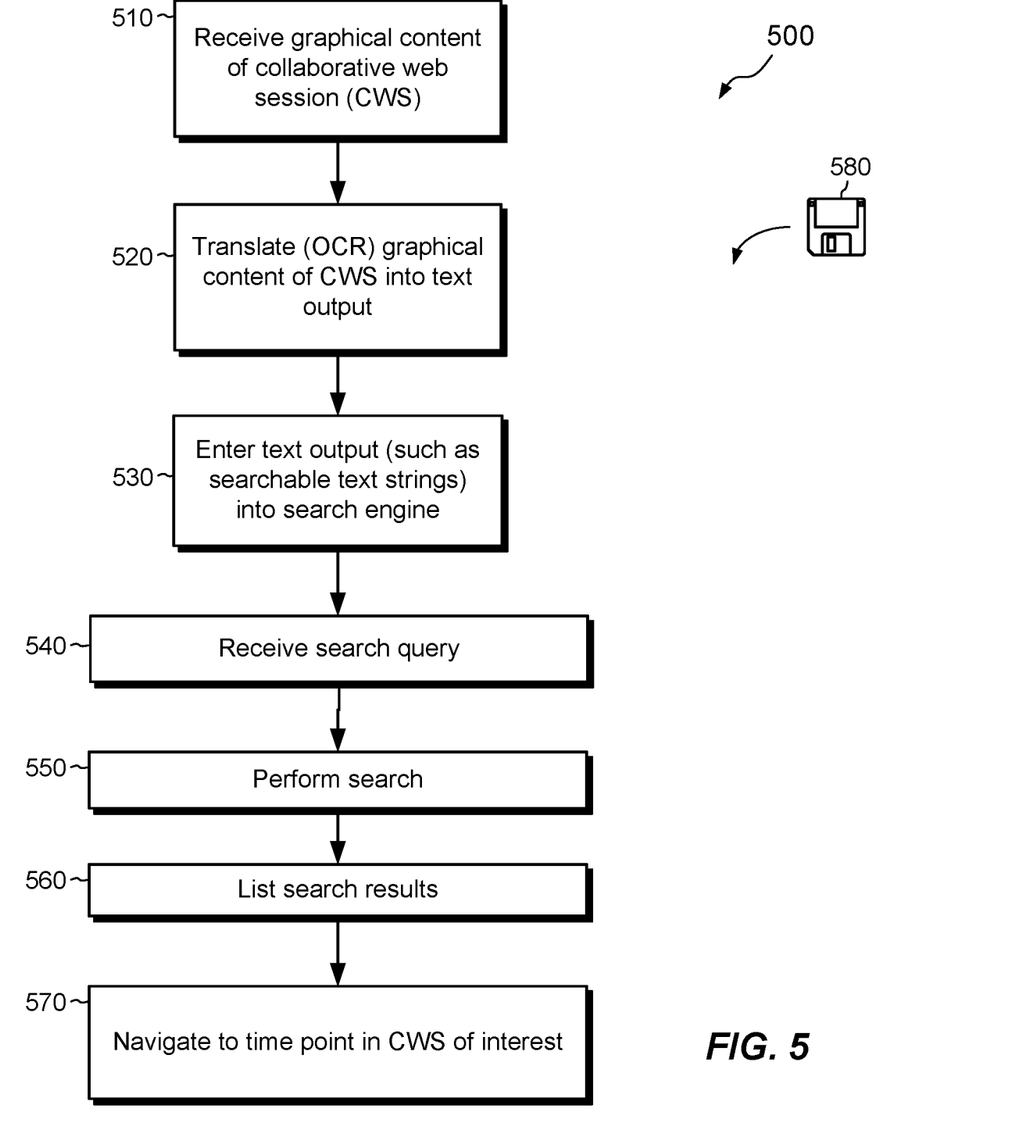
FIG. 5 is a flowchart showing an example method of managing collaborative web sessions in which a user performs a search.

FIG. 5 is a flowchart showing an example method 500 of managing collaborative web sessions in which a user performs a search. At 510, the method 500 receives frames that contain graphical content of the CWS. At 520, the frame finder 142 locates regions of interest in the frames and the OCR engine 144 translates, or OCRs, the regions of interest in the graphical content of the CWS into text output. At 530, the method 500 enters the text output into the search engine 172. At 540, the method 500 receives a search query of one or more search terms from an entity, such as a user, via a user input command. At 550, the method 500 performs a search, by the search engine 172, of the text output for occurrences of the search terms. At 560, the method 500 lists search results. At 570, the method navigates to a time point in the CWS of interest. The time point may be of interest to the user or other entity. The method 500 may save the results of the application services on media 580. In some examples, the method 500 saves the results of the search in the memory 130, in the archived recordings 180, and/or on any device connected to the archive server 120 across the network 114.

Figure 6:
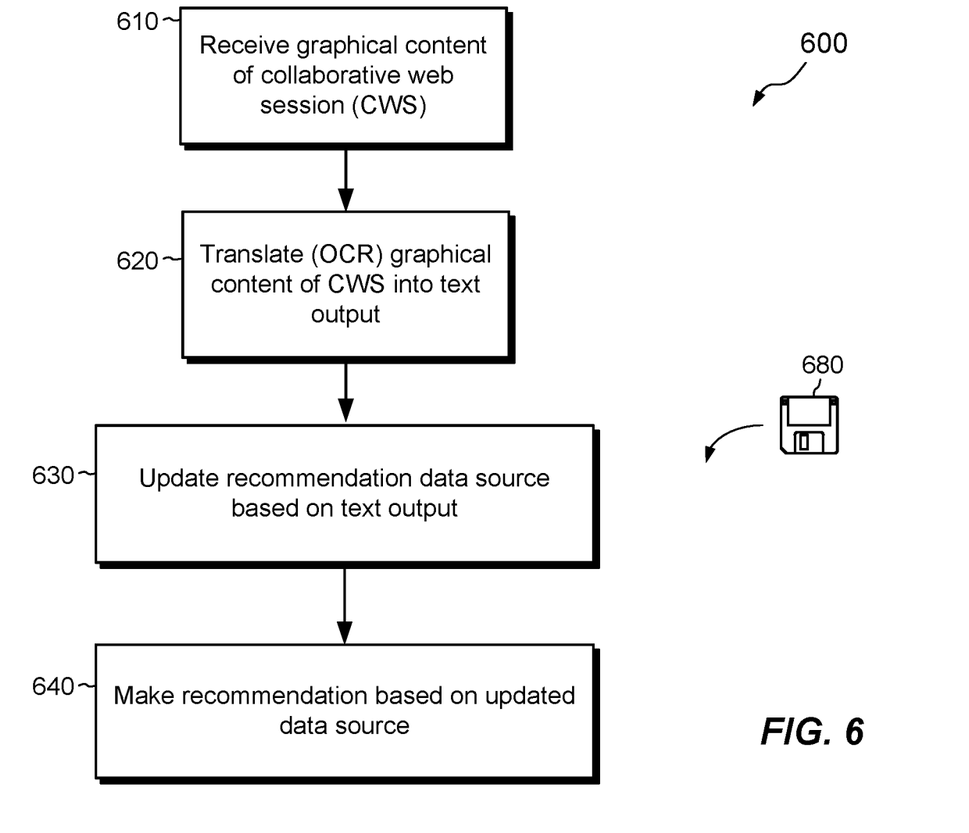
FIG. 6 is a flowchart showing an example method of managing collaborative web sessions in which a recommendation is made to a user.

FIG. 6 is a flowchart showing an example method of managing collaborative web sessions in which a recommendation is made to a user. At 610, the method 600 receives graphical content of the CWS. At 620, the method 600 translates, or OCRs, the graphical content of the CWS into text output. At 630, the method 600 updates the recommendation data source 164 based on the text output. At 640, the method 600 makes a recommendation based on the updated data source 164. The method 600 may save the results of the application services on media 680. In some examples, the method 600 saves the results of the recommendation in the memory 130, in the archived recordings 180, and/or on any device connected to the archive server 120 across the network 114.

An improved technique has been described that captures graphical content visible onscreen during a CWS and renders that content as text output. The text output is applied to a set of text application services that associate the text output with the CWS. Advantageously, text output from content displayed during the CWS becomes part of a record of the session, making it available for searching, recommending other content, and/or enhancing speech-to-text processing, for example.

Having described certain embodiments, numerous alternative embodiments or variations can be made. Although text application services include a speech-to-text service (STT service), a recommendation service, and/or a search service, other text application services may be employed. In some examples, such text application services may include a sharing service that enables sharing of specific portions of graphical content or text output via an enhanced GUI and/or between collaborative web sessions. The text application services may include an editing service that enables users to edit portions of the text output separately from or in conjunction with the sharing service.

In some examples, the graphical content may include objects, icons, or images, or objects, icons, or images formed within other images. In some examples, the frame finder may detect, identify, and/or categorize such objects, icons, or images, providing text labels that can be included in the text output 146 or separately. These text labels can be used by the text application services to direct a user or other entity not only to a location or position of specified text, but also to a location or position of a specific object, icon, or image.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as media 380, 480, 580, 680 of FIGS. 3-6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing collaborative web sessions, the method comprising:
   receiving graphical content of a collaborative web session (CWS);
   translating a set of portions of the graphical content into text output; and
   providing the text output to a set of text application services that associate the text output with the collaborative web session, the set of text application services including a recommendation engine that generates elements on a displayed page of a graphical user interface (GUI) that provide recommendations of collaborative web sessions for a user to view based on the text output.

2. The method of claim 1 wherein, in providing the text output to the set of text application services, at least one of the text application services associates the text output with another collaborative web session.

3. The method of claim 1, further comprising applying the text output to enhance capabilities of the GUI that provides access to the collaborative web session.

4. The method of claim 3, further comprising detecting the graphical content from the collaborative web session based on image analysis of frames of the collaborative web session.

5. The method of claim 4, wherein the graphical content is derived from multiple sources.

6. The method of claim 5, wherein the sources include a screen share source and a webcam source.

7. The method of claim 4, wherein translating the set of portions of the graphical content into text output includes performing optical character recognition (OCR) on the set of portions.

8. The method of claim 7, further comprising accepting user input via the graphical user interface (GUI), the user input specifying a set of modifications of the text output produced by performing the OCR on the set of portions.

9. The method of claim 8, wherein the text output includes multiple words and/or phrases that are specific to a particular domain of expertise.

10. The method of claim 7, further comprising receiving user input that specifies a pronunciation and/or phonetic representation of a word or phrase of the text output.

11. The method of claim 7, wherein the set of text application services further includes a search engine, and wherein providing the text output to the set of text application services includes updating a search index of the search engine to include a word or phrase identified in the text output and/or semantically similar thereto.

12. The method of claim 11, further comprising, in response to receiving a search query specifying a search word or phrase in the text output, displaying by the GUI a set of elements referencing respective collaborative web sessions where the search word or phrase has been found.

13. The method of claim 12, wherein the method further comprises, while the collaborative web session is in progress:
   providing portions of the text output to the search index;
   accepting a search query from a user, the search query specifying a word or phrase to be searched; and identifying a previously-displayed frame of the collaborative web session at a location in the collaborative web session at which the word or phrase to be searched is detected.

14. The method of claim 7, wherein the set of text application services includes a speech-to-text (STT) engine having a STT dictionary, the STT dictionary including terms that are available to be matched to spoken utterances, and wherein the method further comprises:
providing multiple words and/or phrases of the text output to the STT dictionary; and
directing the STT engine to convert spoken utterances in the collaborative web session to corresponding text based upon matching the spoken utterances to terms in the STT dictionary, the matched terms including one or more of the words and/or phrases of the text output.

15. A computerized system, comprising control circuitry that includes a set of processing units coupled to memory, the control circuitry constructed and arranged to:
receive graphical content of a collaborative web session;
translate a set of portions of the graphical content into text output; and
provide the text output to a set of text application services that associate with the text output with the collaborative web session, the set of text application services including a recommendation engine that generates elements on a displayed page of a graphical user interface (GUI) that provide recommendations of collaborative web sessions for a user to view based on the text output.

16. A computer program product including a set of non-transitory, computer-readable media having instructions which, when executed by control circuitry of a computerized system, cause the control circuitry to perform a method of managing collaborative web sessions, the method comprising:
receiving graphical content of a collaborative web session;
translating a set of portions of the graphical content into text output; and
providing the text output to a set of text application services that associate the text output with the collaborative web session, the set of text application services including a recommendation engine that generates elements on a displayed page of a graphical user interface (GUI) that provide recommendations of collaborative web sessions for a user to view based on the text output.

17. The computer program product of claim 16, wherein the set of text application services includes a speech-to-text (STT) engine having a STT dictionary, the STT dictionary including terms that are available to be matched to spoken utterances, and wherein the method further comprising:
providing a set of words and/or phrases from the text output to the STT dictionary; and
directing the STT engine to convert spoken utterances in the collaborative web session to corresponding text based upon matching the spoken utterances to the terms in the STT dictionary, the matched terms including the set of words and/or phrases of the text output.

18. The computer program product of claim 16, wherein the set of text application services further includes a search engine, and wherein providing the text output to the set of text application services includes updating a search index of the search engine to include a word or phrase identified in the text output.

19. The computer program product of claim 16, wherein the recommendation engine includes a viewing history of prior collaborative sessions viewed by the user, and wherein the elements provided by the recommendation engine are further based on the viewing history of the user.

20. The computer program product of claim 19, wherein the elements provided by the recommendation engine are further based on a particular domain of interest of the user, and wherein the recommendation engine generates the elements on the displayed page of the GUI in response to receipt of a user command entered via a control on the GUI.

21. The method of claim 1, wherein the CWS involves multiple participants, and wherein the set of portions of the graphical content translated into text output include portions of graphical content in view of a webcam of one of the conference participants.

22. The method of claim 21, wherein the recommendations of collaborative web sessions displayed by the elements on the page of the GUI include recommendations of previously recorded collaborative web sessions.

* * * * *